United States Patent [19]
Madden et al.

[11] Patent Number: 5,341,319
[45] Date of Patent: Aug. 23, 1994

[54] METHOD AND APPARATUS FOR CONTROLLING A ROUNDING OPERATION IN A FLOATING POINT MULTIPLIER CIRCUIT

[75] Inventors: William C. Madden, Lexington; Vidya Rajagopalan, Hudson; Sridhar Samudrala, Westboro, all of Mass.

[73] Assignee: Digital Equipment Corporation, Maynard, Mass.

[21] Appl. No.: 16,058

[22] Filed: Feb. 10, 1993

[51] Int. Cl.$^5$ ............................................. G06F 7/38
[52] U.S. Cl. ................................... 364/748; 364/745
[58] Field of Search .................... 364/748, 745, 715.10

[56] References Cited

U.S. PATENT DOCUMENTS

| H1222 | 8/1993 | Brown et al. | 364/748 |
| 4,926,369 | 5/1990 | Hokenek et al. | 364/748 |
| 5,260,889 | 11/1993 | Palaniswami | 364/748 |

*Primary Examiner*—Long T. Nguyen
*Attorney, Agent, or Firm*—Richard J. Paciulan; Denis G. Maloney

[57] ABSTRACT

A floating point multiply of two n-bit operands creams a 2n-bit result, but ordinarily only n-bit precision is needed, so rounding is performed. Some rounding algorithms require the knowledge of the presence of any "1" in the n−2 low-order bits of the 2n-bit result. The presence of such a "1", indicates the so-called "sticky bit" is set. The sticky bit is calculated in a path separate from the multiply operation, so the n−2 least significant sums need not be calculated. This saves time and circuitry in an array multiplier, for example. In an example method, the difference between n and the number of trailing zeros, "x", in one of the n-bit operands is detected, by transposing the operand and detecting the leading one. The other operand is right-shifted by a number of bit positions equal to this difference. A sticky bit is generated if any logic "1's" are in the low-order n−x−2 bits fight shifted out of the second operand.

14 Claims, 3 Drawing Sheets

MULTIPLY STICKY BIT DETECTION EXAMPLE FOR n = 8

A = 1.0111000   B = 1.0100100

PRODUCT = 1.11010111 $\underbrace{100000}_{n-2=6}$

STICKY BIT IS TO BE SET

TRANSPOSE A:

00011101

$x = 3$
(NUMBER OF LEADING ZEROS)

RIGHT SHIFT B BY $n - x = 5$

0000010100100

$\underbrace{0000010100}_{n+2}\underbrace{100}$

STICKY DETECTOR OPERATES ON 100 AND DETECTS STICKY BIT.

FIG. 3

# METHOD AND APPARATUS FOR CONTROLLING A ROUNDING OPERATION IN A FLOATING POINT MULTIPLIER CIRCUIT

BACKGROUND OF THE INVENTION

This invention relates to improvements in floating point multiply operations, and more particularly, in one embodiment, to a method for calculating the "sticky bit" in a floating point multiply by utilizing existing normalization and alignment circuitry which is used in floating point add/subtract operations.

A floating point multiply of two n-bit operands creates a 2n-bit result, but only an n-bit result is usually required. Thus, the 2n-bit result is rounded to n-bits in a floating point processor. Some rounding algorithms, for example the "round to nearest/even" algorithm (required by IEEE standard 754-1985), require knowledge of the presence of any "1" in the n−2 low-order bits of the 2n-bit result. The presence of any such "1" causes a so-called "sticky bit" to be set (i.e., set to "1").

Array type multipliers are used in floating point processors of the single-chip type to accelerate the floating point multiply operation. An array multiplier can produce a result in one or two clock cycles, whereas a more conventional multiply implemented by add and shift operations can occupy dozens of clock cycles. Generally, an array multiplier produces the result as two vectors, a sum vector and a carry vector. The vectors must be added in a carry propagate adder to produce the n-bit result. For correct rounding, a carry-out must be generated from the carry-propagate of the low-order n−2 bits. The n-bit final result will not include the sum bits of the low-order n−2 bit addition, and therefore generating these sums constitutes a costly overhead both in terms of speed and chip area. The low-order n−2 bit carry-out, in conjunction with the sticky bit, is used to correctly round the n-bit result.

An observation by Santoro et al in "Rounding Algorithms for IEEE Multipliers," Proc. Ninth IEEE Symposium on Computer Arithmetic, p. 176-183, 1989, suggests computing the sum of trailing zero's in the multiplier and multiplicand, so if the sum is n−2 or larger, then the sticky bit will not be set.

SUMMARY OF THE INVENTION

In accordance with one embodiment of the invention, a method of generating a sticky bit in a floating point multiplier circuit uses circuitry in parallel with the multiplier. The number of trailing zeros, x, in one of the n-bit operands is detected, by transposing the operand and detecting the leading one. The other operand is right-shifted by a number of bit positions equal to the difference n−x zeros. A sticky bit is generated if any logic "1's" are in the n−x−2 bits right shifted out of the second operand.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings, wherein:

FIG. 3 is a numerical example of the method of FIGS. 1 and 2.

DETAILED DESCRIPTION OF SPECIFIC EMBODIMENT

Figure 1:
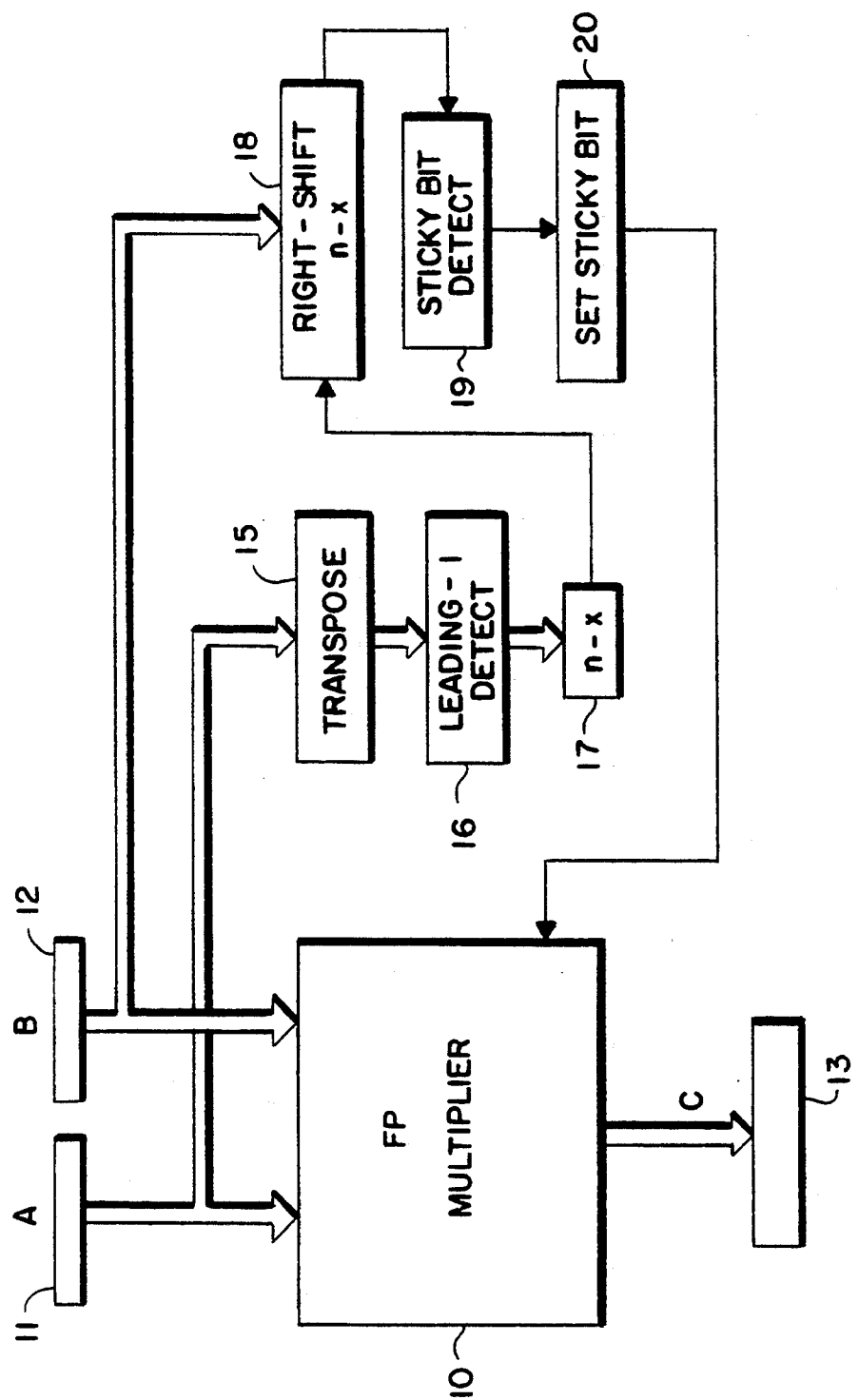
FIG. 1 is an electrical diagram of a multiplier circuit for use in a floating point processor according to one embodiment of the invention.

Referring to FIG. 1, a multiplier circuit 10 for use in a floating point processor or the like in a microprocessor chip is adapted to accept two n-bit operands A and B from registers 11 and 12 and to produce an n-bit output (product) in register 13. The multiplication may be done by an adder and left shifter, which would require a number of cycles to complete, or preferably may be by a dedicated array multiplier circuit. In general the array multiplier produces the result as two vectors, a sum vector and a carry vector. The vectors must be added in a carry propagate adder to produce the n-bit result. For correct rounding, a carry-out must be generated from the carry-propagate of the low-order n−2 bits. Note that the n-bit final result will not include the sum bits of the low-order n−2 bit addition, and therefore generating these sums constitutes a costly overhead both in terms of speed and area. To accommodate various standard requirements, however, there are three bits saved in addition to the n-bit value. The first is the rounding bit, n+1. The second is the guard bit, n+2. The third is the "sticky bit" representing the OR of all of the n−2 low-order bits that are dropped. That is, if any "1" bit is in the field to be dropped the sticky bit is set, otherwise if all these bits are "0" then the sticky bit is a zero. The round, sticky and guard bits, in conjunction with the carry out of the low-order n−2 bits, are used to correctly round the n-bit result.

According to one embodiment of the invention, the value of the sticky bit is calculated from the input values A and B, separate from and in parallel to the multiply operation going on in the multiplier 10. This sticky bit calculation is accomplished by circuitry that is already in existence in a typical floating-point processor. The circuitry for implementing this calculation is shown in FIG. 1, and the method used is illustrated in FIG. 2 in logic flow chart form.

The first step is to count the trailing zeros in the operand A, and this is accomplished by first transposing A using circuit 15 (for an 8-bit example, bit-8 becomes bit-1, bit-7 becomes bit-2, etc.) and then detecting the leading 1, using a leading-1 detector 16. A leading-1 detector and shifter are usually present in a floating-point processor anyway to implement normalization. A suitable leading-1 detector is disclosed in co-pending application Ser. No. 08/016,054, Feb. 10, 1993 by Sharon M. Britton, Randy Allmon, and Sridhar Samudrala (PD92-0059), for "Leading One/Zero Bit Detector for Floating Point Operation," assigned to Digital Equipment Corporation, the assignee of this invention, incorporated herein by reference. Detecting the leading 1 in the transposed operand will result in a value representing the difference between n and the trailing zeros in the untransposed operant, which is the desired value, designated "n−x" in the flow chart. The next step is to right-shift the operand B by a number of bit positions equal to "n−x" This is accomplished using a right-shift circuit 18, and the lower n−x−2 bits being shifted out are examined in a detector circuit 19 to see if any are "1's" and, if so, the sticky bit is set by circuit 20. This detector 19 is already present in a floating point processor to implement sticky bit detection for add/subtract operations.

Figure 2:
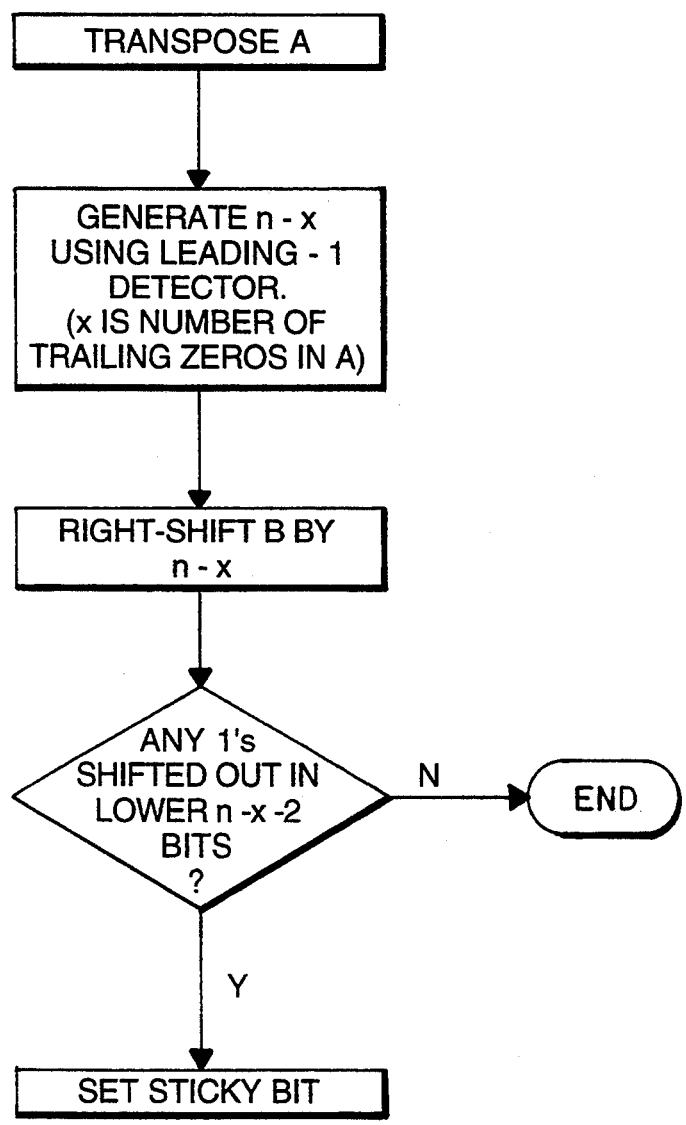
FIG. 2 a logic flow chart of a method of calculating the sticky bit as implemented in the circuit of FIG. 1.

An example of the procedure of FIG. 2 is shown in FIG. 3. In this example, the data path width n=8. For A=1.0111000 and B=1.0100100, the 2n-bit product is 1.11010111100000, and the value of the n−2=6 field (the lower six bits of the product) is 100000, so the sticky bit should be set.

For the example of FIG. 3, the first step of the FIG. 2 procedure is to transpose A, producing the value 00011101, then count the leading zeros to produce the value of x, and x=3 in this example. The next step is to right-shift B by n−x or 8−3=5, producing the value 0000010100100.

Since right shift is an alignment operation the add-/sub sticky detector will detect any "1's" to the right of n+2 (i.e., in the n−x−2 or 8−3−2=3 LSB's).

This algorithm also works for multiple data type widths, d1, d2, ... di ... dm, provided these widths are less than or equal to n bits. Examples from the IEEE Standard 754-1985 are S data type (n=24) and T data type (n=52). Consider a data type of width d, where d<n. In the datapath there will be d significant bits and n−d trailing zeros. Assume the operand itself has y trailing zeros, then the total number of trailing zeros in the datapath is y+n−d. The leading-1 detector will detect y+n−d leading zeros, and cause a right shift of n−(y+n−d)=d−y, exactly the correct shift to detect the sticky bit since the sticky bit detector for data type width d will look for 1's to the right of d+2.

Use of the sticky bit detection method described above provides a significant saving in circuitry compared to alternate solutions such as computing all the intermediate sums for the n−2 low-order bits, and detecting the sticky bit on this result. Or, compared to using two trailing zero detectors and an adder to implement the Santoro algorithm. If the intermediate sums were calculated, the performance of the multiplier array would also suffer, since the calculation of the sums would interfere with the carry propagate performance.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A floating point multiplier circuit, comprising:
   a) an array multiplier having a first input for receiving a first n-bit operand and a second input for receiving a second n-bit operand, and having a output for producing an n-bit result;
   b) trailing zero detecting means receiving said first n-bit operand and calculating the number of trailing zeros x, in said n-bit operand, and generating a value n−x;
   c) right-shifting means receiving said second n-bit operand and right-shifting said second n-bit operand by a number of bit positions equal to said value n−x;
   d) detecting means responsive to bits shifted out by said right-shifting means to generate a sticky bit if any logic "1's" are in n−x−2 bits shifted out of said right-shifting means.

2. A floating point multiplier circuit according to claim 1 wherein said trailing zero detection means includes a transposing circuit for transposing the bits of said first n-bit operand and a leading "1" detector for generating said value.

3. A floating point multiplier circuit according to claim 2 wherein said leading "1" detector uses a normalization circuit in a floating point processor.

4. A floating point multiplier circuit according to claim 1 wherein said detecting means uses a sticky bit detector for an add/subtract circuit in a floating point processor.

5. A method of controlling a rounding operation in a floating point multiplier circuit comprising the steps of:
   a) generating a value n−x representing the difference between n and the number of trailing zeros x in a first n-bit operand;
   b) right-shifting a second n-bit operand by a number of bit positions equal to said value n−x;
   c) generating a sticky bit control signal if any logic "1's" are in n−x−2 low-order bits shifted out by said right-shifting; and
   d) performing said rounding operation by said floating point multiplier circuit in response to said sticky bit control signal.

6. A method of controlling a rounding operation in a floating point multiplier circuit according to claim 5 wherein said step of generating a value includes transposing the bits of said first n-bit operand and detecting a leading "1" in the transposed operand.

7. A method of controlling a rounding operation in a floating point multiplier circuit according to claim 5 wherein said steps of generating a value, right-shifting and generating a sticky bit, are all conducted in circuits separate from a multiplier circuit performing said multiply operation.

8. A method of controlling a rounding operation in a floating point multiplier circuit, comprising the steps of:
   a) applying a first n-bit operand to a first input of an array multiplier, and applying a second n-bit operand to a second input of said multiplier, the multiplier producing an n-bit result;
   b) generating a value representing the difference between and the number of trailing zeros in said first n-bit operand;
   c) right-shifting said second n-bit operand by a number of bit positions equal to said value;
   d) generating a sticky bit control signal if any logic "1's" are in low-order n−x−2 bits shifted out by said right-shifting; and
   e) performing said rounding operation by said floating point multiplier circuit in response to said sticky bit control signal.

9. A method of controlling a rounding operation in a floating point multiplier circuit according to claim 8 wherein said step of generating a value includes transposing the bits of said first n-bit operand and detecting a leading "1" in the transposed operand.

10. A method of controlling a rounding operation in a floating point multiplier circuit according to claim 9 wherein said step of detecting a leading "1" detector uses a normalization circuit in a floating point processor.

11. A method of controlling a rounding operation in a floating point multiplier circuit according to claim 8 wherein said step of generating a sticky bit uses a sticky bit detector for an add/subtract circuit in a floating point processor.

12. A circuit for controlling a rounding operation in a floating point multiplier comprising:
   a) trailing zero detecting means receiving a first n-bit operand and generating a value representing the difference between and the number of trailing zeros in said first n-bit operand;
   b) right-shifting means receiving a second n-bit operand and right-shifting said second n-bit operand by a number of bit positions equal to said value;
   c) detecting means responsive to bits shifted out by said right-shifting means to generate a sticky bit control signal if any logic "1's" are in low-order n−x−2 bits shifted out by said right-shifting means; and
   d) means for performing said rounding operation by said floating point multiplier circuit in response to said sticky bit control signal.

13. A circuit for controlling a rounding operation in a floating point multiplier according to claim 12 wherein said trailing zero detection means includes a transposing circuit for transposing the bits of said first n-bit operand and a leading "1" detector for generating said value.

14. A circuit for controlling a rounding operation in a floating point multiplier according to claim 12 wherein said trailing zero detection means, said right-shifting means, and said detecting means, are all circuit separate from a multiplier circuit performing a multiply operation.

* * * * *